United States Patent [19]

Alexander, Jr. et al.

[11] Patent Number: 5,946,311
[45] Date of Patent: Aug. 31, 1999

[54] METHOD FOR ALLOWING MORE EFFICIENT COMMUNICATION IN AN ENVIRONMENT WHEREIN MULTIPLE PROTOCOLS ARE UTILIZED

[75] Inventors: Cedell Adam Alexander, Jr., Durham; Rajesh Ishwariah Balay, Cary; Matthew B. Squire, Raleigh, all of N.C.

[73] Assignee: International Business Machines Corporation, Armonk, N.Y.

[21] Appl. No.: 08/863,796

[22] Filed: May 27, 1997

[51] Int. Cl.⁶ .................................................. H04L 12/28
[52] U.S. Cl. ........................... 370/395; 370/401; 370/466
[58] Field of Search ..................... 370/390, 391, 370/392, 395, 397, 399, 400, 401, 402, 404, 405, 465, 466, 469, 252, 396

[56] References Cited

U.S. PATENT DOCUMENTS

| | | |
|---|---|---|
| 4,975,906 | 12/1990 | Takiyasu et al. . |
| 5,327,428 | 7/1994 | Van As et al. . |
| 5,394,402 | 2/1995 | Ross . |
| 5,452,296 | 9/1995 | Shimizu . |
| 5,570,084 | 10/1996 | Ritter et al. . |
| 5,581,552 | 12/1996 | Civanlar et al. . |
| 5,594,732 | 1/1997 | Bell et al. . |
| 5,600,644 | 2/1997 | Chang et al. . |
| 5,684,800 | 11/1997 | Dobbins et al. ........................ 370/401 |
| 5,777,994 | 7/1998 | Takihiro et al. ........................ 370/395 |
| 5,805,805 | 10/1998 | Civanlar et al. ...................... 395/200.5 |
| 5,818,842 | 10/1998 | Burwell et al. ........................ 370/397 |
| 5,828,665 | 10/1998 | Husak ..................................... 370/387 |
| 5,835,481 | 11/1998 | Akyol et al. ............................ 370/216 |

*Primary Examiner*—Chau Nguyen
*Assistant Examiner*—Soon-Dong Hyun
*Attorney, Agent, or Firm*—John J. Timar; Felsman, Bradley, Vaden, Gunter & Dillion

[57] ABSTRACT

Provided are a method and system that allow one or more network protocol emulators, composed of one or more network protocol emulation controllers and one or more network protocol emulation entities, which are overlaid onto the one or more base networks utilizing different communications protocols for the purpose of allowing said one or more networks to be accessed and utilized as if the one or more networks were utilizing protocols emulated by the one or more network protocol emulators. The method and system utilize the following steps. Apprising the one or more network protocol emulation controllers of network capability information inherent within protocols utilized by the one or more networks onto which the one or more network protocol emulation controllers are overlaid. Directing that the one or more network emulation controllers utilize the one or more network capability information of which they have been apprised to define communication capabilities for certain network protocol emulation entities within the control of the one or more network protocol emulation controllers. Directing either the one or more network protocol emulation controllers or the one or more certain network protocol emulation entities within the control of the network protocol emulation controllers to utilize such defined communications capabilities to ensure that the network protocol emulation entities do not request a communications link to one or more other network protocol emulation entities that substantially exceeds the defined communication capabilities of the one or more other network protocol emulation entities.

20 Claims, 11 Drawing Sheets

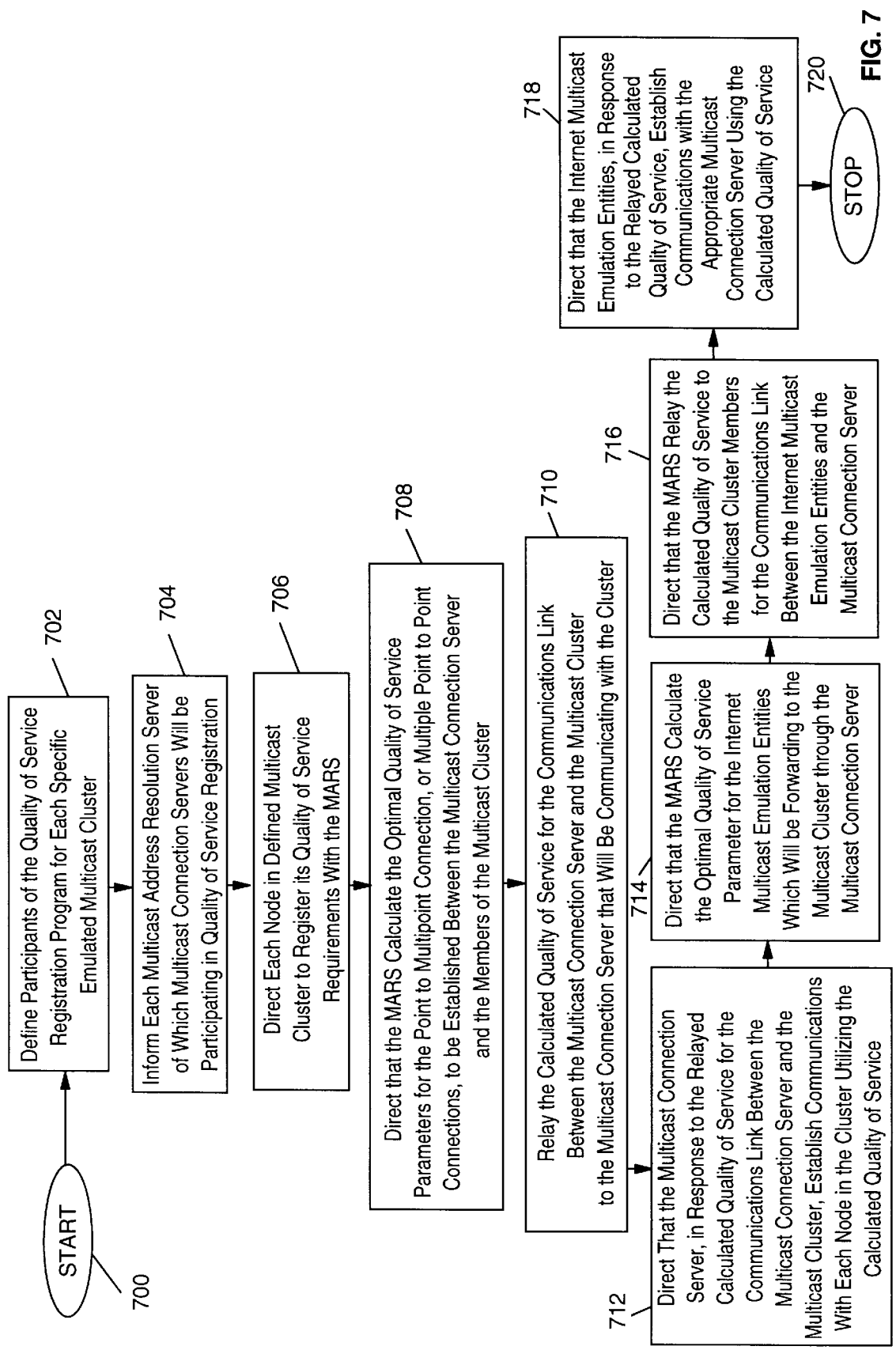

METHOD FOR ALLOWING MORE EFFICIENT COMMUNICATION IN AN ENVIRONMENT WHEREIN MULTIPLE PROTOCOLS ARE UTILIZED

BACKGROUND OF THE INVENTION

1. Technical Field

The present invention is related to a method and system to be utilized in a multiple protocol environment. In particular, the present invention is related to a method and system to be utilized in a multiple protocol environment wherein the method and system allow one or more protocols overlaid onto one or more base protocols to utilize the one or more base protocol information in order to provide efficient communications between entities utilizing said overlaid protocols. Yet still more particularly, the present invention is related to a method and system to be utilized in a multiple protocol environment where one of the protocols can be Asynchronous Transfer Mode and wherein the method and system allow protocols overlaid onto an ATM protocol to utilize ATM protocol information in order to provide efficient communications between entities utilizing said overlaid protocols.

2. Description of the Related Art

The present invention is directed toward remedying deficiencies and solving problems relating to the overlaying of one or more base protocols with one or more other protocols intended to extend the capabilities and functionalities of the one or more underlying base protocols. For sake of illustration, the discussion of the present invention is directed toward remedying deficiencies and solving problems relating to the overlaying of Asynchronous Transfer Mode (ATM) protocols with protocols intended to extend the capabilities and functionalities of the underlying ATM protocols. However, those skilled in the art will recognize that the discussion is not limited to ATM but extends to the general deficiencies and problems that relate to the overlaying of one or more base protocols with one or more other protocols intended to add capabilities and functionalities to the one or more underlying base protocols.

ATM is a communications protocol that (a) enables the transmission of voice, data, image, and video signals over wide area, high bandwidth communications systems; (b) provides fast packet switching in which information is inserted into small fixed size cells that are multiplexed and switched in a slotted operation, based upon header content, over a virtual circuit established immediately upon request for service; (c) has been chosen as the switching standard for broadband integrated services digital networks (BISDNs); (d) has variable transmission rates; (e) offers bandwidth on demand service, and (f) supports multiple concurrent connections over single communications lines. Weik, *Communications Standard Dictionary* 47 (3rd ed. 1996).

As stated, ATM is a type of fast packet switching protocol. A packet, in data communications, is a sequence of binary digits that has one or more of the following characteristics: (a) includes data, control signals, and possibly error control signals, (b) is transmitted and switched as a composite whole, (c) is arranged in a specific format, such as a header part and a data part, (d) may consist of several messages or may be part of a single message, (e) is used in asynchronous switched systems, and (f) is usually dedicated to one user for a session. Weik, *Communications Standard Dictionary* 690 (3rd ed. 1996). A fast packet switching protocol increases the speed of packet switching by eliminating overhead (i.e., information in a packet which is solely utilized for efficient and correct communications and has no information content of interest to the ultimate network user). Weik, *Communications Standard Dictionary* 690 (3rd ed. 1996).

In an ATM protocol network fast packet switching protocol overhead is reduced by (1) allocating flow control (making sure that a network node's buffer capacity is not exceeded) and error control (making sure that information is not corrupted) to nodes within the network, and (2) providing different Quality of Service (with lower Quality of Services requiring less overhead) dependent upon requirements received from ATM protocol network users.

The ability of ATM to provide different Quality of Service is one of the greatest advantages of ATM. These different qualities of service allow data communications networks to carry, in an integrated way, both real-time traffic such as voice and high resolution video which can tolerate some loss but not delay, as well as non-real-time traffic such as computer data and file transfer which may tolerate some delay but not loss. The problem with carrying these different types of traffic on the same medium in an integrated fashion is that the peak bandwidth requirement of these traffic sources may be quite high as in high resolution full motion video, but the duration for which the data is actually transmitted may be quite small. In other words, the data comes in bursts and must be transmitted at the peak rate of the burst, but the average arrival time between bursts may be quite large and randomly distributed.

In the judgement of telecommunication industry analysts, the indicated trend for multimedia integrated telecommunications and data communications demands of global economies in the late 90's and early 21st century is for the foregoing discussed types of data traffic to increase. ATM provides the mechanisms whereby such user data demands may be satisfied without unduly consuming network communications resources. Hence, there is tremendous pressure from the telecommunications industry to move toward ATM protocol networks.

Unfortunately for the telecommunications industry, there exists today a tremendous installed base of non-ATM protocol networks (e.g., Wide Area Networks (WANs), Local Area Networks (LANs), Internet Protocol Networks) which do not utilize ATM protocol. Furthermore, some of the non-ATM protocol networks have features, which ATM protocol networks do not provide but that user systems have come to rely upon and have been designed to utilize. Thus, the telecommunications industry has been in a quandary in that the industry desires to move to ATM protocol networks, but a huge percentage of its customer base has previously invested in hardware and software designed for non-ATM protocol networks.

The telecommunications industry has opted for an attrition strategy to solve this problem. Under this strategy, the industry has opted to move toward ATM protocol networks while simultaneously continuing to support the vast installed base of non-ATM protocol networks, and the network and link layer protocols operating on these networks. (The hope being that as new users come on line they will utilize ATM protocol equipment and that as older systems are phased out, they will be replaced with ATM protocol systems.) The key to this strategy is empowering the ATM protocol networks to be able to support non-ATM protocols, and to be able to supply non-ATM features which users have come to expect and rely upon.

The telecommunications industry has opted to provide such support and supply such features via various "overlay" schemes. While the specifics of any particular overlay implementation are horrendously complex, the general idea is relatively straightforward: any non-ATM capability will be provided by a (logically) separate protocol that is (logically) overlaid onto a base ATM protocol network. The (logically) overlaid protocol is then utilized to allow non-ATM protocol networks to interact with ATM protocol networks "as if" the ATM protocol networks were a part of, and hence recognize the protocols and support the features of, non-ATM protocol networks. Three of the more well-known overlay schemes are the following: Local Area Network Emulation (which allows a local area network station on one local area network to communicate with other one or more stations not on the local area network by and through an ATM protocol network "as if" the stations were in fact on the local area network); Multicast Operation (a scheme which allows an ATM protocol network to support and appropriately respond to a request from an Internet Protocol network for a multicast operation); and Resource Reservation Protocol (RSVP) (a very high level scheme which allows internetworked disparate base subnetworks to guarantee a Specified Quality of Service on a communications link irrespective of the functioning of the underlying base subnetworks). These schemes will be discussed under the detailed description of illustrative embodiments section, below.

While the foregoing noted schemes of overlaying work well from the standpoint of allowing non-ATM protocol networks to communicate with and through ATM protocol networks, there are deficiencies in such an approach.

One deficiency is that such overlaying schemes do not make use of the capabilities of a tremendous amount of information inherent within an ATM protocol network.

It was stated above that ATM protocol networks support the ability to efficiently transport many types of data by providing many different Qualities of Service. While the specifics of how this is done need not be discussed at this point, a way in which this is achieved is to make the ATM protocol network nodes more autonomous (i.e., allowing the nodes to make data handling decisions in a more independent fashion than generally allowed in non-ATM protocol networks). The ATM protocol network nodes are able to achieve this autonomy because such nodes have access to a tremendous amount of information about the data handling capabilities of other ATM protocol network nodes in the ATM protocol network. This information is intermittently disseminated throughout the ATM network by each ATM protocol network node "flooding" (i.e., simultaneously transmitting to many nodes within the ATM protocol network) the network with its (the flooding node's) current data handling capacity. The ATM protocol network nodes then utilize this information about other nodes to autonomously make routing decisions.

The foregoing described network overlay schemes are not actually part of the ATM protocol, but rather are ways of overlaying a non-ATM protocol onto an ATM protocol. Because these overlaying schemes are not actually part of the ATM protocol, the participants in the schemes are generally not privy to all the inter-nodal communication which is being utilized by the ATM protocol network to provide Quality of Service guarantees. That is, generally the overlaying schemes are somewhat "dumb" in that they are not part of, and do not take advantage of, information related to the data handling capacities of the different nodes in the underlying ATM protocol networks. Because the participants in the overlay schemes are not privy to such internodal communication, such participants will often request Quality of Service communication links to other overlay scheme participants which exceeds the quality of service capabilities of the ATM protocol network nodes that are to support such communications links between overlay participants.

Once an overlay scheme participant (hereinafter the "source participant") requesting a communications link to another overlay scheme participant (hereinafter the "destination participant") finds out that the ATM protocol network cannot support the requested Quality of Service, the source participant can enter into negotiation, via the ATM network, with the destination participant with which the source participant wishes to establish contact. This negotiation is engaged in to determine what Quality of Service the ATM network can support between the two participants. Alternatively, the source participant will engage in a best-effort operation. In either case, the source participant continues to request a progressively lower quality of service link with the destination participant until either the destination can accommodate the source (i.e., a connection is established) or the attempt to establish communications fails. Both scenarios (negotiation and best effort) generally require much time and consume much network bandwidth.

The scenarios are so time and bandwidth intensive because source participants are generally unaware of the underlying ATM protocol network capabilities. Consequently, should an initial request for a communications link fail, the source participant essentially just keeps retrying to establish a link with the destination participant at successively lower qualities of service until a link is successfully established. Such negotiation would not have been necessary had the source participant been privy to the network traffic information which was resident within the ATM protocol network, since the source participant would have known at the outset the communications capabilities that the ATM protocol network could support between the source participant and the destination participant with which the communications link is to be established.

Thus, it is apparent from the foregoing that a need exists for a method and system which allows participants utilizing protocols, overlaid onto ATM protocol networks for the purpose of extending the capabilities of ATM protocol networks, to utilize ATM protocol network information in order to provide more efficient communications between entities utilizing the overlaid protocols.

SUMMARY OF THE INVENTION

It is therefore one object of the present invention to provide a method and system to be utilized in a multiple protocol environment.

It is therefore another object of the present invention to provide a method and system to be utilized in a multiple protocol environment wherein the method and system allow one or more protocols overlaid onto one or more base protocols to utilize the one or more base protocol information in order to provide efficient communications between entities utilizing said overlaid protocols.

It is yet still another object of the present invention to provide a method and system to be utilized in a multiple protocol environment where one of the protocols can be Asynchronous Transfer Mode and wherein the method and system allow protocols overlaid onto an ATM protocol to utilize ATM protocol information in order to provide efficient communications between entities utilizing said overlaid protocols.

The foregoing objects are achieved as is now described. Provided are a method and system for more efficient protocol network communication. The method and system provided are to be utilized within a multiple protocol environment. The method and system allow one or more network protocol emulators, composed of one or more network protocol emulation controllers and one or more network protocol emulation entities, which are overlaid onto the one or more base networks utilizing different communications protocols for the purpose of allowing said one or more networks to be accessed and utilized as if the one or more networks were utilizing protocols emulated by the one or more network protocol emulators. The method and system accomplish their objects via the following steps. Apprising the one or more network protocol emulation controllers of network capability information inherent within protocols utilized by the one or more networks onto which the one or more network protocol emulation controllers are overlaid. Directing that the one or more network emulation controllers utilize the one or more network capability information of which they have been apprised to define communication capabilities for certain network protocol emulation entities within the control of the one or more network protocol emulation controllers. Directing either the one or more network protocol emulation controllers or the one or more certain network protocol emulation entities within the control of the network protocol emulation controllers to utilize such defined communications capabilities to ensure that the network protocol emulation entities do not request a communications link to one or more other network protocol emulation entities that substantially exceeds the defined communication capabilities of the one or more other network protocol emulation entities, so that more efficient multiple protocol communications are achieved.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 7 is a high level logic flowchart of the method and process whereby the present invention can be implemented in a MARS environment;

DETAILED DESCRIPTION OF ILLUSTRATIVE EMBODIMENT

Figure 1:
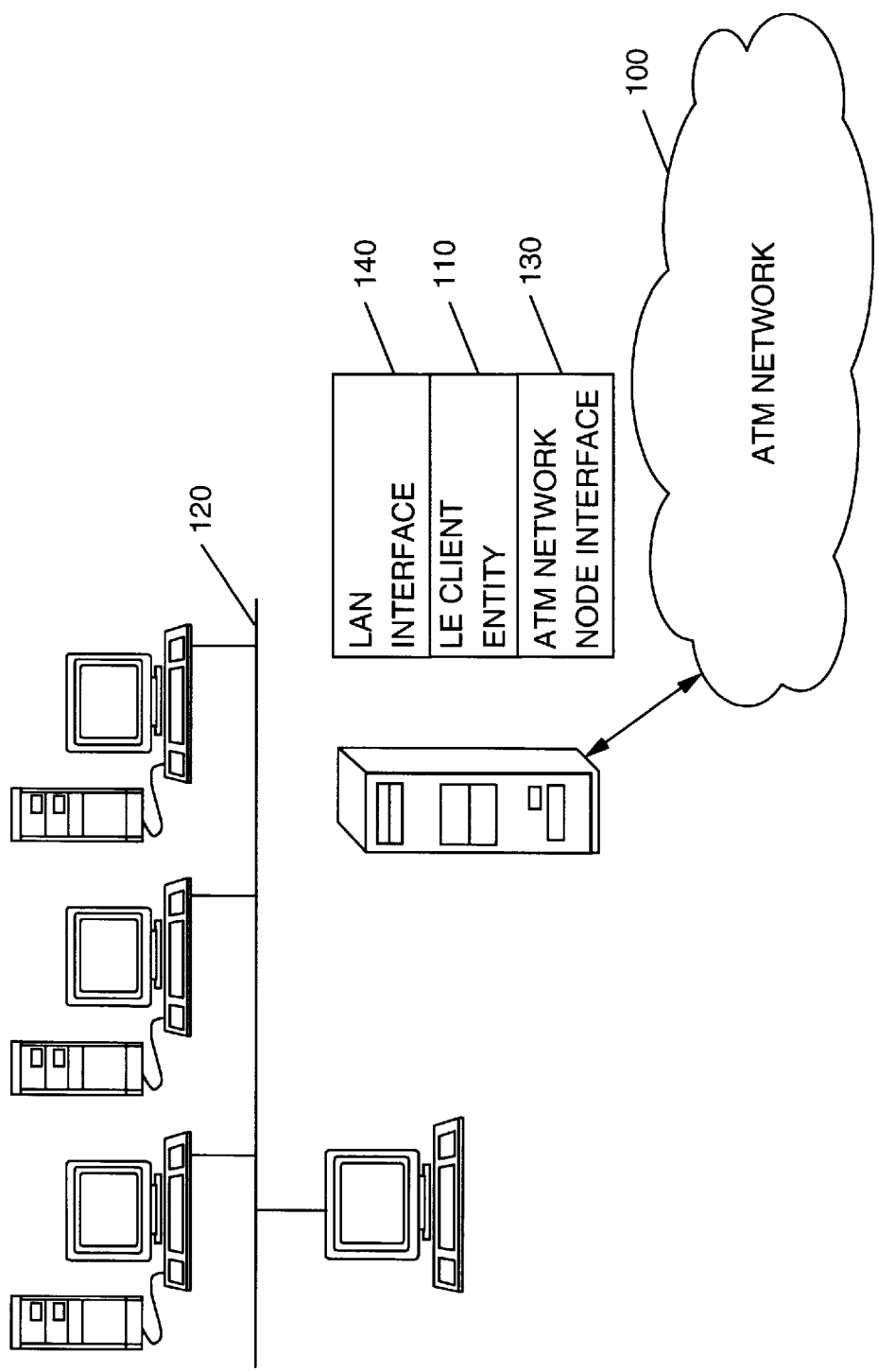
FIG. 1 is a partially schematic diagram which defines an environment where an illustrative embodiment of the present invention will function.

The following involves discussion of specific ATM protocols known in the art. Those skilled in the art will recognize that any specific discussion of ATM networks necessarily requires use of a number of acronyms and ATM specific concepts. Following, brief descriptions of acronyms utilized will be given. Those requiring more detailed descriptions of the acronyms are referred to the ATM references well known to those within the art.

The following presents detailed descriptions of three illustrative embodiments of the proposed method and system: one focused on utilizing an illustrative embodiment of the proposed method and system with Local Area Network Emulation systems; a second focused on utilizing an illustrative embodiment of the proposed method and system with a Multicast operation emulation; and a third focused on utilizing an illustrative embodiment of the proposed method and system with Resource Reservation Protocol (RSVP). Those skilled in the art will recognize that an illustrative embodiment of the present invention will function in any environment wherein a base data communications network is overlaid with any system which makes the base network appear and function as if the base network were in fact running protocols and providing functions different from those which the base network in actuality is running and providing. The following described illustrative embodiments are set forth to illustrate the concepts and principles involved in such functioning.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

Illustrative Embodiment Directed Toward Local Area Network Emulation Protocol There are different ways of running network layer protocols across an (overlay mode) ATM network, but one of the most popular is known as LAN Emulation (LANE). The LANE designation applies to a specific protocol by which local area networks are emulated, but those skilled in the art will recognize that LANE is representative of all emulation schemes which "overlay" one protocol scheme (e.g., an Ethernet protocol) on top of a network running a different protocol scheme (e.g., an ATM protocol).

As the name suggests, the function of the LANE protocol is to emulate a local area network on top of an ATM network.

The LANE protocol defines mechanisms for emulating well known LANs such as Ethernet and Token Ring LANs.

What LAN Emulation means is that the LANE protocol defines a service interface for higher layer (that is, network layer) protocols, which is identical to that of existing LANs, and that data sent across the ATM networks are encapsulated in the appropriate LAN MAC (medium access control) packet format. It does not mean that any attempt is made to emulate the actual media access control protocol of the specific LAN concerned (that is, CSMA/CD for Ethernet or token passing for Token Ring LANs).

In other words, the LANE protocols make an ATM network look and behave like an Ethernet or Token Ring LAN.

The rationale for doing this is that it requires no modifications to higher layer protocols to enable their operation over an ATM network. Since the LANE service presents the same service interface of existing MAC protocols to network layer drivers, no changes are required in those drivers (i.e,, no changes are necessary to the devices on a true LAN which are utilizing a LAN Emulation).

The LANE protocol defines the operation of a single emulated LAN (ELAN). Multiple ELANs may coexist simultaneously on a single ATM network since ATM connections do not "collide." A single ELAN emulates either Ethernet or Token Ring. A single ELAN is composed of a Lan Emulation Server (LES), Broadcast and Unknown Server (BUS), and Lan Emulation Clients (LECs) of that LE Server. Each individual ELAN is managed by a LAN Emulation Configuration Server (LECS). It is easiest to discuss how an illustrative embodiment of the present invention provides more efficient communication between LE clients by first defining what entities each of the foregoing terms refer to, explaining how such entities work together, and then explaining how the present invention functions within an ELAN composed of such entities.

A LAN Emulation Configuration Server (LECS) manages each Emulated LAN (ELAN) in an administrative domain which the LECS controls. There is logically one LECS per administrative domain, and each LECS creates and controls the ELANs within that LECS' domain. A specific ELAN is composed of one Lan Emulation Server/Broadcast and Unknown Server to which are assigned a number of individual LAN Emulation Clients.

An ELAN is a LAN that exists solely in logic, but is such that it appears to stations on a true, physical, LAN "as if" the stations on the ELAN actually exist. An ELAN is created by having a LAN Emulation Server (LE Server), manage a collection of communications elements (or nodes) such that the communications elements managed can function "as if" they were in fact part of a local area network.

A LAN Emulation Configuration Server manages an individual ELAN by assigning a number of LAN Emulation Clients (LE Clients) to a particular LE Server. A LE Client is an entity that often serves an intermediary function between a true Local Area Network and an ATM network where an ELAN has been established. Logically, as is shown in FIG. 1, LE Proxy Client 110 sits between LAN 120 and ATM network node 130. Basically, LE Proxy Client 110 is "listening" to traffic on LAN 120 through LAN interface 140 (it will be understood by those within the art that interposed between LAN interface 140 and LE Proxy Client 110 and all such similar entities herein described is "Bridge" or "Router" entities which control the forwarding of data packets between interfaces; however, such entities are not shown in the interests of economy). LE Proxy Client 110 has a list of MAC (e.g., in ELAN) addresses for which LE Proxy Client 110 provides its emulation function. Should LE Proxy Client 110 detect a message directed to one of the MAC addresses for which LE Proxy Client 110 is providing an emulation function, LE Proxy Client 110 relays that message to LAN 120.

Figure 2:
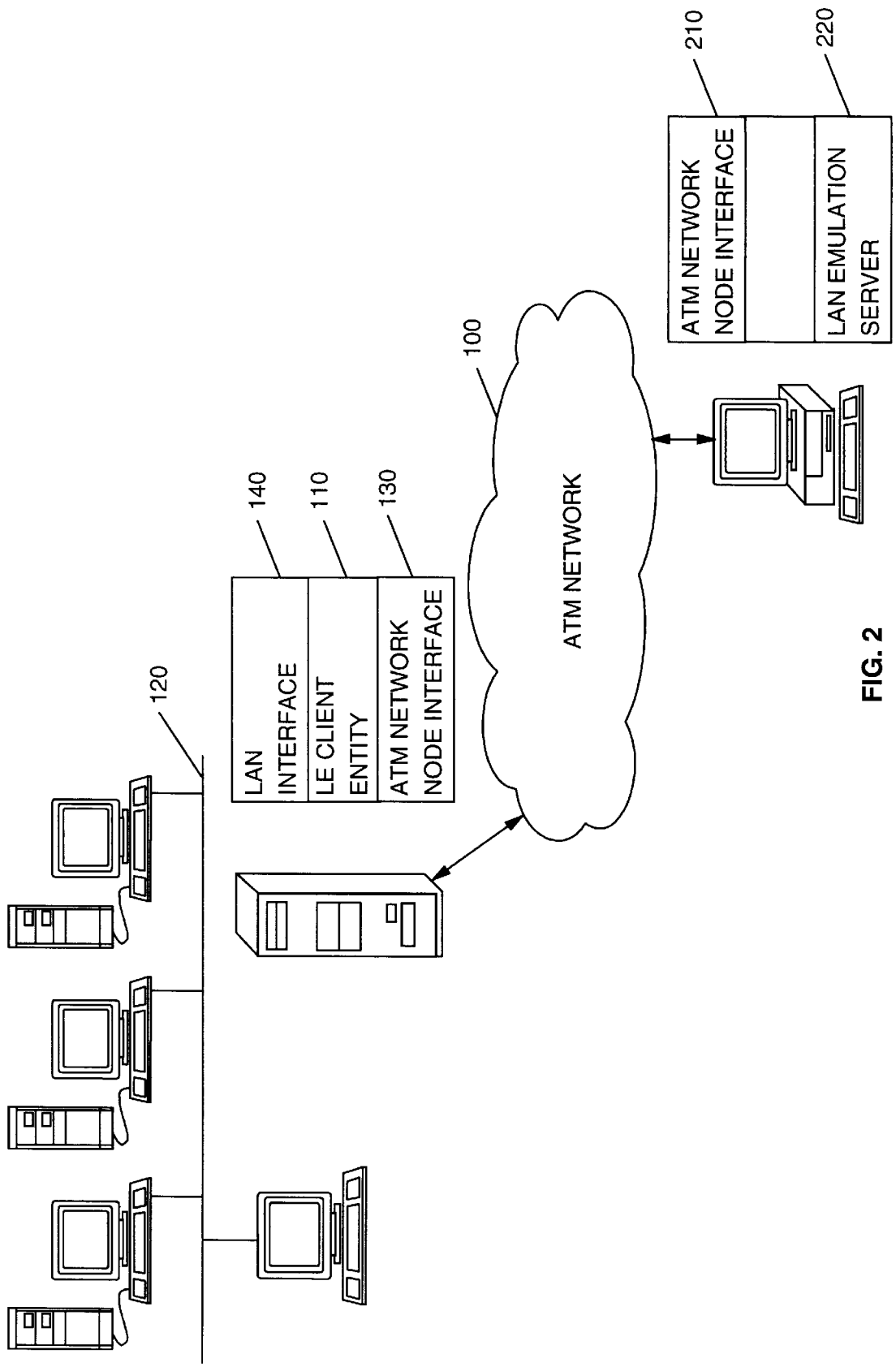
FIG. 2 builds on FIG. 1 and is a partially schematic diagram which further defines an environment where an illustrative embodiment of the present invention will function.

Once LE Proxy Client 110 has detected a message on LAN 120, via LAN interface 140, directed toward an ELAN address for which LE Proxy Client 110 is responsible, LE Proxy Client 110 relays that message to the LAN via interface 140. This communication takes place through an ATM network itself utilizing ATM protocol as is shown in FIG. 2. LE Proxy Client 110 via ATM network node interface 130 and through ATM network node interface 210 asks its LAN Emulation Server 220 to return to it an ATM address corresponding to the node within the ATM network wherein the LAN Emulation Client corresponding to the detected LAN address is resident.

Ordinarily, in response to this query LAN Emulation Server 220 would just return to the requesting LE Client an ATM address corresponding to the ATM network node wherein the desired LE Client resides which support the detected ELAN.

Figure 3:
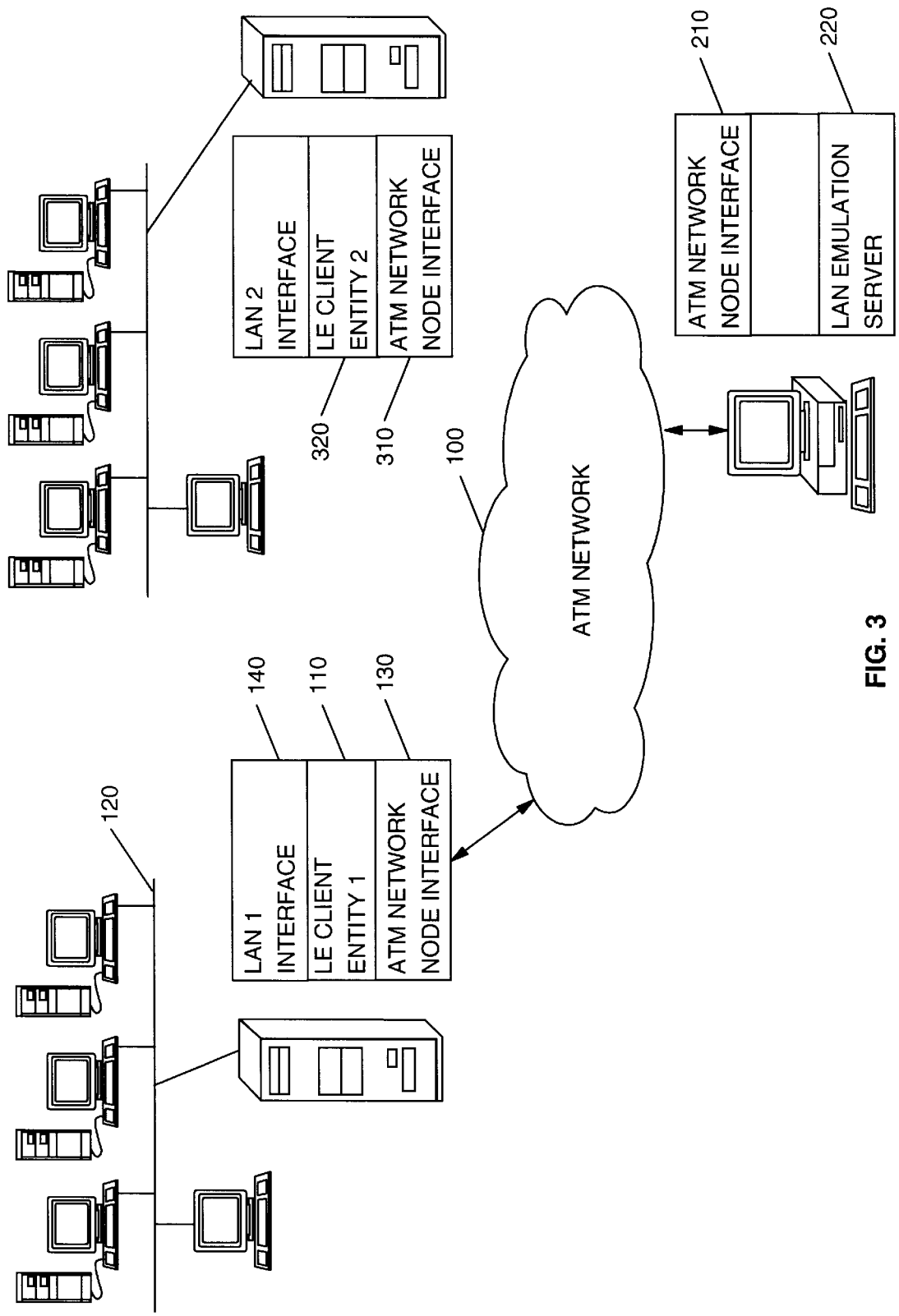
FIG. 3 builds on FIG. 2 and is a partially schematic diagram which yet still further defines an environment where an illustrative embodiment of the present invention will function.

Subsequently, as is shown in FIG. 3, the requesting LE Proxy Client 110 would communicate via ATM network node interface 130 through ATM network node interface 310 and request from a second LE Client 320 the establishment of a communications link between the two LE Clients 110 and 320, with the requested Quality of Service of such a link being dictated by certain default parameters stored at LE Proxy Client 110.

Since LE Proxy Client 110 is "blindly" (i.e., without knowledge of the communications capabilities of a second LE Client 320) requesting a certain Quality of Service link, it is quite possible that the second LE Client 320 will be unable to support the requested Quality of Service due to the fact that the underlying ATM network node supporting LE Client 320 is unable to support the requested Quality of Service. In the event that the ATM network node supporting a second LE Client 320 cannot support the requested Quality of Service, LE Proxy Client 110 and LE Client 320 either barter back and over the ATM network, as discussed previously, or engage in the best-effort operations discussed previously, until a communications link of a Quality of Service supportable by both LE Proxy Client 110 and LE Client 320 can be established.

The present invention does not follow either of the foregoing described course of events. In the present invention, when the LAN Emulation Server returns the ATM network node address to the first LE Client, the ATM network traffic information (e.g., the Quality of Service that the returned ATM network node address can support is also returned). The first LE Client can then utilize this information to request a communications link within the capabilities of the ATM network node supporting the second LE Client, thereby eliminating the "negotiation" illustrated in FIG. 3.

An illustrative embodiment of the present invention avoids the LE Proxy Client 110—LE Client 320 negotiation referred to in relation to FIG. 3 in large part by making LAN Emulation Clients aware of the communications link that each LAN Emulation Client's network node can support prior to any LAN Emulation Client attempting to establish a communications link with any other LAN Emulation Client. As has been discussed above, information as to the communications capabilities of LAN Emulation Client nodes is usually not available to other LE Clients. The present invention solves this problem by making such information for each member of the "emulated" network available to each LAN Emulation Client. This can be accomplished by having each LAN Emulation Client register, at least once, its (the LAN Emulation Client's) data communications capabilities with the appropriate LE Server.

Subsequently, when one LAN Emulation Client requests an ATM network node address for a particular targeted other LAN Emulation Client from its LAN Emulation Server, the LAN Emulation server will return both the ATM network node address and the communications capacity of that returned ATM network node address. The requesting LAN Emulation Client can then utilize such returned information to ensure that the communications capacity of the targeted LAN Emulation Client is not exceeded. The foregoing thus eliminates the rejected setup requests due to mismatched capabilities, as discussed above in relation to FIG. 3, by allowing the LAN Emulation Clients to be aware of each others' capabilities.

Figure 4:
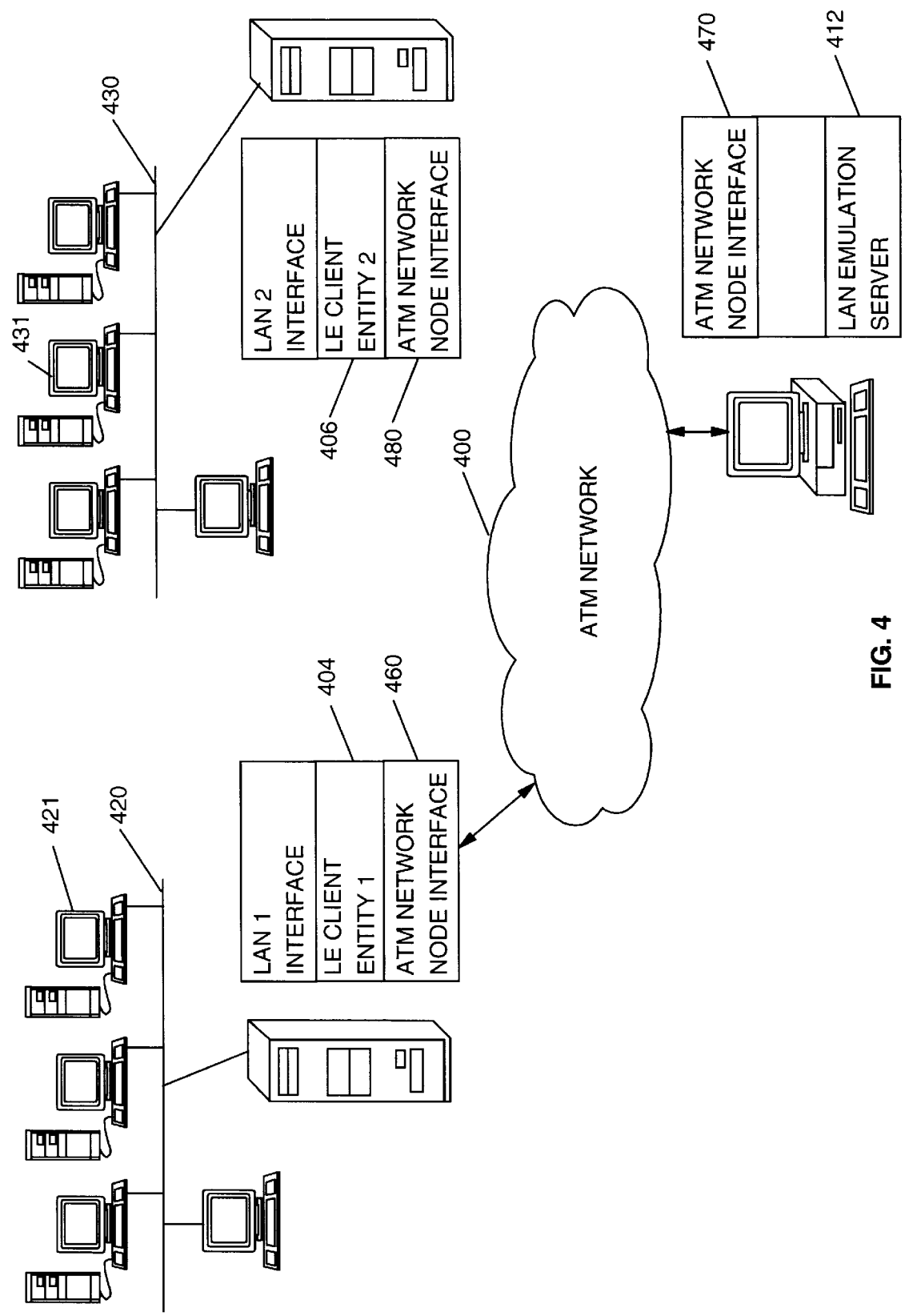
FIG. 4 builds on FIG. 3 and is a partially schematic diagram of an environment wherein the present invention is to be utilized and representation of the general operation of an illustrative embodiment of the present invention as it relates to an Emulated Local Area Network.

Refer now to FIG. 4, which is a partially schematic representation of the general operation of an illustrative embodiment of the present invention as such relates to an emulated local area network. FIG. 4 is intended to illustrate an operational ELAN.

FIG. 4 shows a base ATM network 400 and an "overlaid" Emulated LAN which is shown with component LAN Emulation Clients (LE Clients) 404 and 406 and LAN Emulation Server (LE Server) 412. Also shown are LAN 420 and LAN network 430, which (transparently) penetrate the ATM network through LE Clients 404 and 406.

For sake of illustration assume that client 421 on LAN 420 desires to communicate with client 431 on LAN 430. As can be seen by the figure, such communication has to take place across base ATM network 400. This is done via the "overlaid" emulation network. In operation, client 421 transmits frames to client 431.

Utilizing the method and process of an illustrative embodiment of the present invention requires that LE Client 404 and LE Client 406 reliably informs LE Server 412 of the Quality of Service which can be supported by such clients (which the LE Clients know by communication with ATM network node interface 460 and 480, respectively). This operation is referred to in an illustrative embodiment as "QoS Registration." The foregoing also being known in an illustrative embodiment of the present invention as "QoS Registration." However, in both the foregoing example cases the method and process of an illustrative embodiment of the present invention ensure that LE Server 412 is apprised of the Quality of Service supportable by the LE Clients within its domain.

In response to client 421's communications with client 431, LE Client 404 recognizes that client 431 is part of the "network" that LE Client 404 is "emulating." Thus, in response to client 421's communications with client 431, LE Client 404 initiates communication via its supporting ATM network node interface 460 and through ATM network node interface 470 via ATM network protocol with LE Server 412 and queries LE Server 412 as to the ATM node address corresponding to the LE Client wherein client 431 resides. LE Server 412 is so named because it functions as the "server" for the "network" being "emulated." LE Server 412 replies to LAN Emulation Client 404 and returns both the ATM address of the ATM node wherein the LAN Emulation Client 406 (i.e., the LE Client supporting the ELAN address associated with client 431) resides and the Quality of Service that LAN Emulation Client 406 can support back to LE Client 404.

Using this returned information, LE Client 404 initiates communication through its supporting ATM network node via ATM network protocol to the ATM node wherein LE Client 406 resides and asks that a link between the two ATM nodes be established with a certain defined Quality of Service which is consonant with the Quality of Service supportable by the LAN Emulation Client supporting the LAN address associated with client 431. Since LE Client 404 only requests a link known to be within the Quality of Service supportable by the LAN Emulation Client supporting the LAN address associated with client 431, it is likely that the protracted negotiations between LE Clients, as was referred to in relation to FIG. 3, above, can be avoided.

Figure 5A:
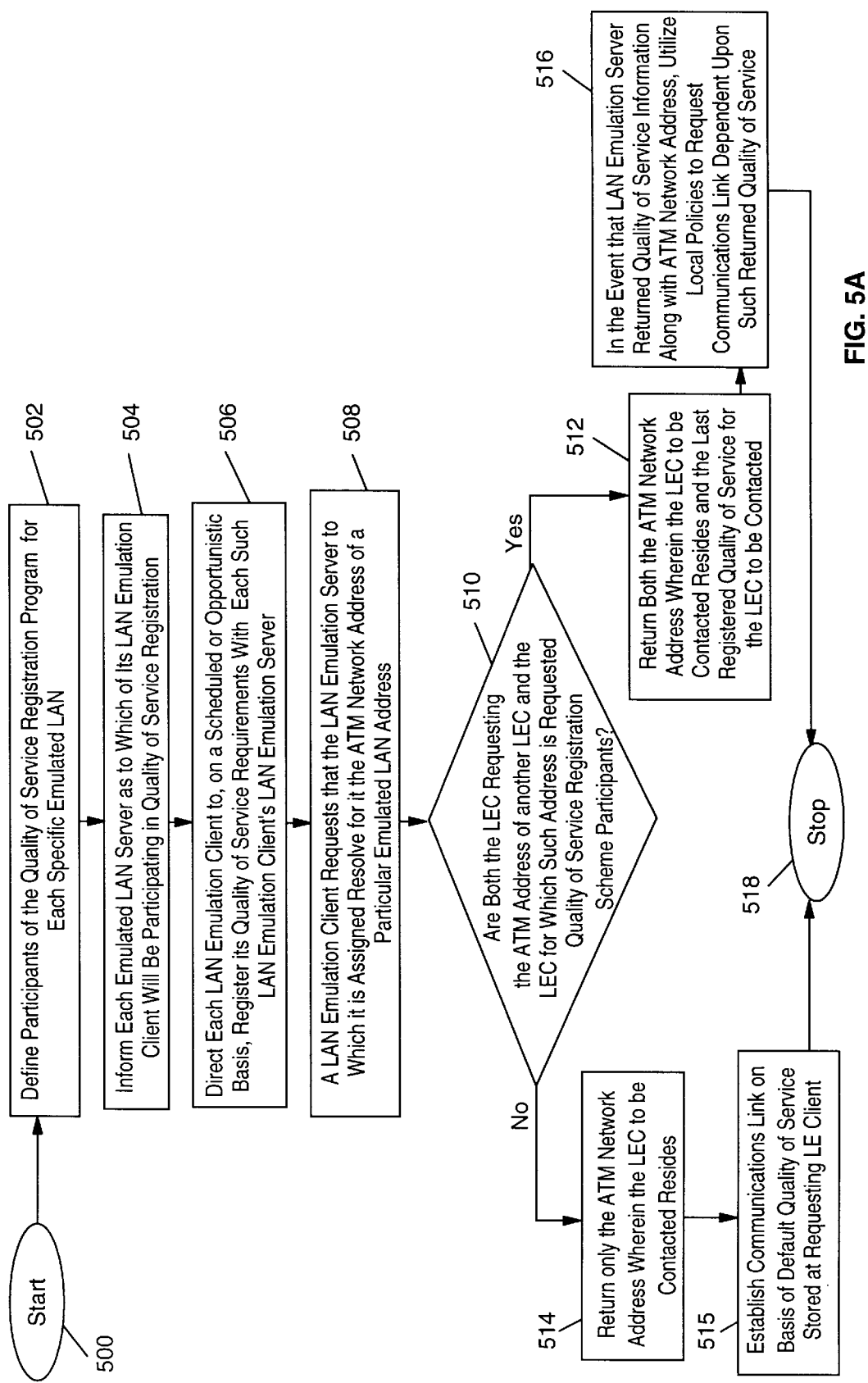
FIG. 5A depicts a high level logic flowchart illustrating an illustrative embodiment of the present invention.
Figure 5B:
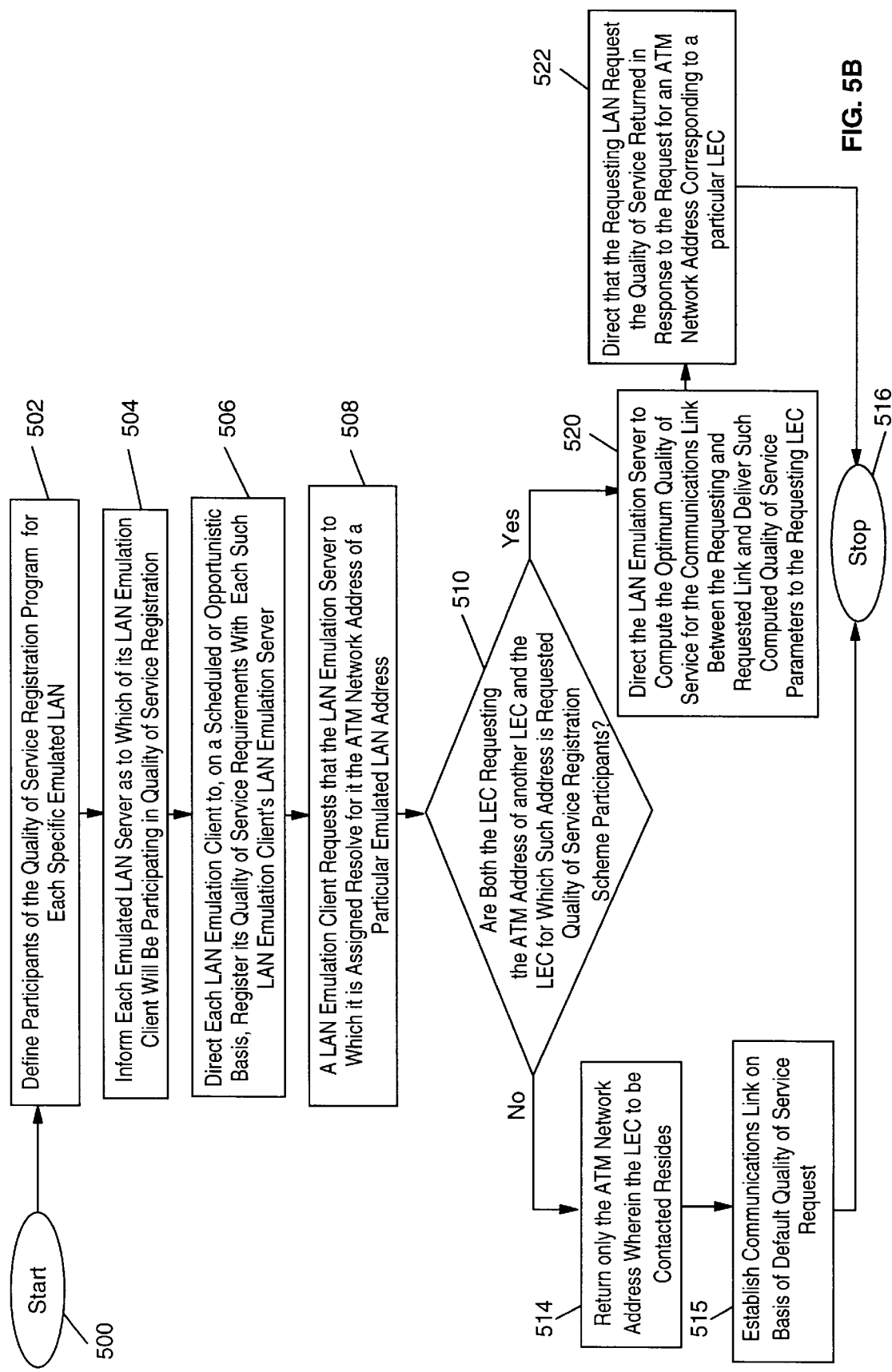
FIG. 5B depicts a high level logic flowchart illustrating an implementation similar to that shown in FIG. 5A.

As was mentioned above in relation to FIG. 4, the present invention provides the ability for overlaid systems to access germane information from the underlying network. FIGS. 5A, and 5B illustrate a few specific ways in which such is done.

Referring now to FIG. 5A, there is depicted a high level logic flowchart illustrating what is referred to in an illustrative embodiment of the present invention as the process of "QoS registration." "QoS registration" is a mechanism which allows overlaid systems to access and utilize information resident within an underlying ATM network.

Method step 500 shows the start of the process. Method step 502 depicts the definition of the LAN Emulation Clients that will participate in the QoS Registration. Method step 502 is generally performed by a LAN Emulation Configuration Server. Method step 504 illustrates that each LAN Emulation Server will be informed as to which of its LAN Emulation Clients will be participating in QoS Registration. Method step 506 illustrates direction given to each LAN Emulation Client participating in QoS Negotiation to register, on a scheduled or opportunistic basis, its desired traffic/QoS parameters with the LAN Emulation Server to which it is assigned. One example of opportunistic reporting would be for a participating LAN Emulation Client to return such information when its LAN Emulation Server queries that LE Client as to whether or not that LE Client is supporting a particular Emulation LAN address.

The traffic/QoS parameters are registered in the form of a "TLV." "TLV" stands for type-length-value and are data elements which contain technical parameters. TLVs are utilized by LAN emulation to define certain communications link parameters. The information in the TLVs may be transformed into traffic parameters for an ATM network.

Method steps 508, 510, 512 and 514 show that when LE Client asks its LAN Emulation Server for the ATM network node corresponding to a particular LAN address, the LE Servers reply to such address resolution request with both the ATM network node of the destination LE Client and the TLV of the destination LE Client, provided that the requesting LE Client has also registered its traffic/QoS parameters with the Server (i.e., that the requesting LE Client is a participant in the QoS registration scheme.). Method steps 510 and 514 show that if either the requesting LE Client or the requested LE Client have not made the requesting LE Client's LE Server aware of their desired QoS parameters, then the LE Client's LE Server only returns the ATM network node address of the requested LE Client. Method step 515 shows that in response to the returned address, the requesting LE Client will then contact the requested LE Client and ask that a communications link be established based upon a default QoS stored within the requesting LE Client. Method steps 510 and 512 show that if both the requesting LE Client and the requested LE Client have made the LE Server aware of their desired QoS parameters, then the process proceeds to method step 516.

Method step 516 shows that the requesting LE Client, after receiving an ATM network node address plus the QoS TLV via a reply from the LE Server, uses local policy (such as utilizing the lowest QoS common to both the requesting and requested LE Client) to determine the communications link parameters (e.g., QoS parameters) that are best suited for communication between the two LE Clients. That is, the LE Server relays the QoS parameters to participating entities while the LE Clients use their own policies to decide the QoS parameters to use for a connection. The LE Client thereafter utilizes the negotiated parameters for establishing a connection to the destination LE Client. Method step 518 shows the end of the process.

With reference now to FIG. 5B, there is depicted a high level logic flowchart illustrating an implementation similar to that shown in FIG. 5A is set forth, except that the role of the LE Client and the LE Server are as follows. In the scheme set forth in FIG. 5B, the idea is that the LE Server is best positioned to compute a set of parameters for communication between any two LE Clients.

Method steps 500–510 are exactly the same as in FIG. 5A and function as described previously. Method steps 510 and 514 show that if either the requesting LE Client or the requested LE Client have not made the requesting LE Client's LE Server aware of their desired QoS parameters, then the LE Client's LE Server only returns the ATM network node address of the requested LE Client. Method step 515 shows that in response to the returned address, the requesting LE Client will then contact the requested LE Client and ask that a communications link be established based upon a default QoS stored within the requesting LE Client. Method steps 510 and 520 show that if both the requesting LE Client and the requested LE Client have made the LE Server aware of their desired QoS parameters, then the process proceeds to method step 522.

Method step 522 depicts the event of the LAN Emulation Server determining the best QoS for the communications link between the requesting LE Client and the LE Client with which communications are to be established. Those skilled in the art will recognize that there are multiple policies which the LE Server could use to compute a set of parameter for communication between any two clients. One way would be for the LE Clients to register their parameters for the cumulative traffic received/transmitted by them. The LE Server could then use this information to determine an optimal set of parameters for each pair of LE Clients. Thereafter, when a LE Client requests the ATM network address for the node serving another LE Client, the LE server would return this resolved QoS parameter along with the ATM network node address. Method step 522 shows that in response to the information returned in method step 520, the requesting LE Client would then establish communication with the LE Client located at the returned ATM network node address using the returned resolved QoS parameters (i.e., the requesting LE Client will use the ATM network address and QoS parameters returned to establish the communications link with the targeted LE Client).

In the foregoing example of FIG. 5B, the LE Server uses the registered TLV (from which QoS information is determined ) to build a fully connected network topology with the LE Clients as the nodes and the optimal QoS parameters as the links. Those skilled in the art will recognize that the foregoing along with the above example applies to other protocol schemes (e.g., CIP, MARS, NHRP).

The foregoing discussion with respect to ELANs exemplified the present invention generally. Although some mention was made of LAN emulation, it was intended and will be recognized by those in the art that the foregoing illustrates the functioning of the present invention in any environment where an overlaid protocol can benefit from information inherent within a network protocol onto which the protocol is overlaid.

Illustrative Embodiment Directed Toward Multicast Operation

The foregoing described ELAN scheme is currently utilized within the industry to give ATM networks LAN emulation capabilities and is an example of a "pure" overlay scheme. However, different network communications focus groups (e.g., the ATM Forum) have been trying to modify and expand the ATM protocols themselves so that eventually the ATM protocol itself will have built into it features which will allow ATM networks to directly support and provide the functions of non-ATM networks.

As is well known within the art, one of the primary areas in which such groups have been working is to extend ATM to function seamlessly with networks running Internet Protocol. The problem with the foregoing is that the Internet Protocol has been around for more than thirty years, and itself has been extended, grown, and modified such that it (the Internet Protocol) extends to its users a tremendous array of services. Rather than trying to expand ATM to allow full functionality with Internet Protocol networks, focus groups have instead concentrated on giving ATM the capability to interact with a limited subset (said subset being defined by the focus groups) of the full Internet Protocol suite.

Thus, problems arise as to how to handle situations in which an Internet Protocol network needs to interact with an ATM network, where such Internet Protocol network is utilizing an Internet Protocol functionality that is not contained within the subset of Internet Protocol which ATM protocol networks can currently support. In general, these problems are solved by using an "overlay" scheme essentially conceptually equivalent to that utilized in the ELAN scheme. That is, a system, composed of a server and defined clients, is "overlaid" onto an ATM base network with such overlaid system utilizing a non-ATM protocol and thus giving rise to an ability to provide capabilities outside the supported subset of Internet Protocol.

Those skilled in the art will recognize that one area in which the foregoing is done is that of Internet Protocol Multicasting. Internet Protocol Multicasting is (generally) not contained within the "classical Internet Protocol." Thus, typically an overlay scheme is used to provide such a service to users who desire it.

Currently, support of the IP multicast behavior is generally provided by a combination of multicast servers and overlaid point-to-multipoint connections. In such an overlaid system, a Multicast Address Resolution Server (MARS) serves a group of nodes known as a "cluster." All end systems within the cluster are configured with the ATM address of the MARS. The MARS supports multicast through "multicast meshes" of overlaid point-to-multipoint connections, or sometimes through multicast connection servers (MCS), also referred to in the art as multicast servers.

Figure 6A:
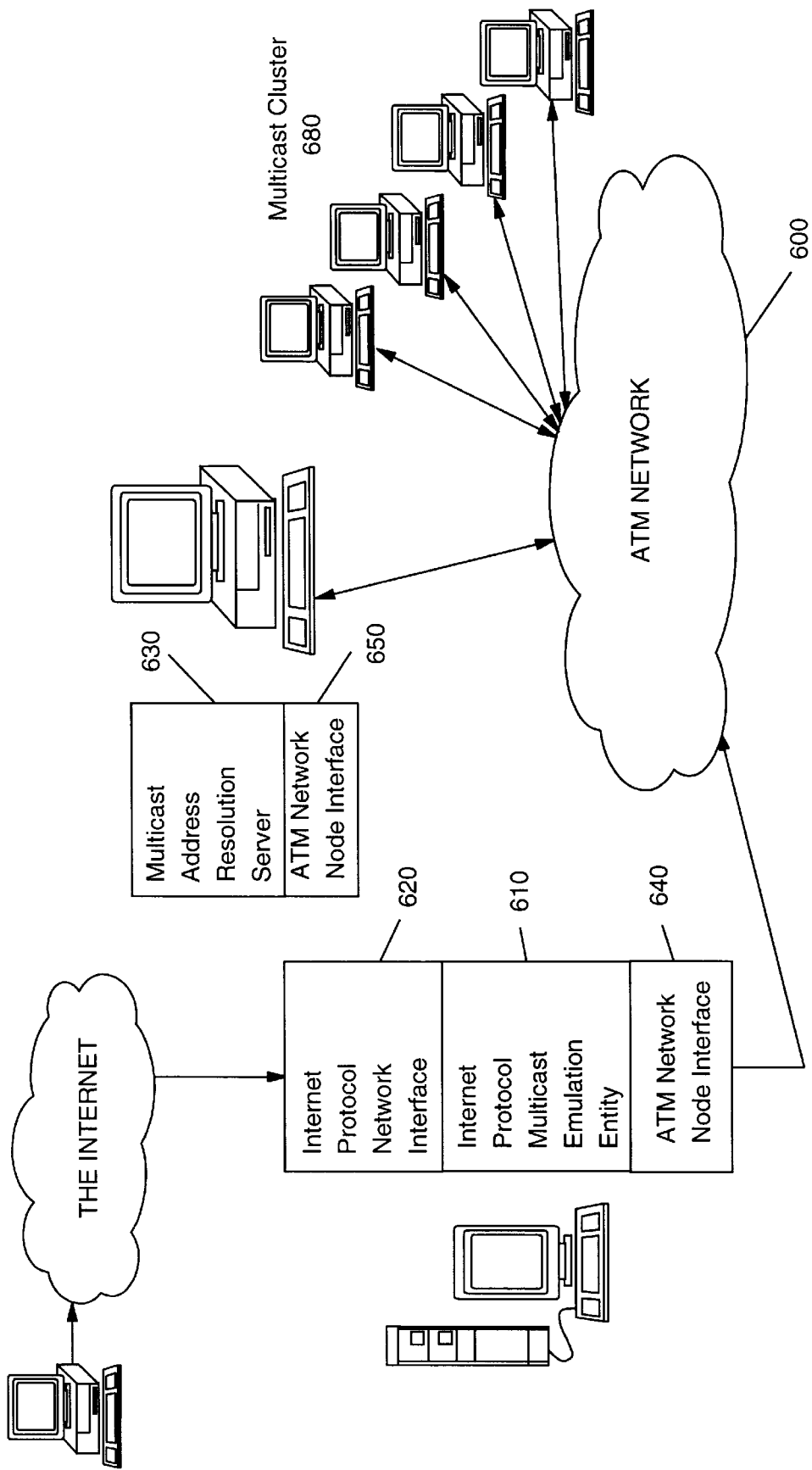
FIG. 6A is a partially schematic diagram which demonstrates the functioning of a MARS system.

FIG. 6A is a partially schematic diagram which demonstrates the functioning of a MARS system. As shown, an Internet Protocol Multicast Emulation Entity 610 dialogs with an Internet Protocol network interface 620. If a device wishes to engage in Internet Protocol Multicast to a particular multicast cluster within ATM network 600, the Internet Protocol Multicast Emulation Entity 610 contacts the Multicast Address Resolution Server (MARS) 630, via ATM network node interface 640 and through ATM network node interface 650, and tells MARS 630 that Internet Protocol Multicast Emulation Entity 610 desires to multicast to MARS 630's multicast cluster 680.

In a multicast mesh case, MARS 630 logically assists in setting up multicast cluster 680. Once the cluster has been defined MARS 630 returns to requesting Internet Protocol Multicast Emulation Entity 610 the ATM addresses of all the members of the cluster (those skilled in the art will recognize that MARS 630 can logically construct groups drawn from multiple different MARS populations, but such level of complexity is not necessary for explaining the present invention, although the present invention is intended to function in such an environment). The Internet Multicast Protocol Emulation Entity 610 then uses those ATM addresses to set up point to point or point to multipoint connections. This case is similar to the case described for LANE (i.e., QoS discussion applies similarly in that MARS 630 could reply back with QoS information along with ATM addresses).

Figure 6B:
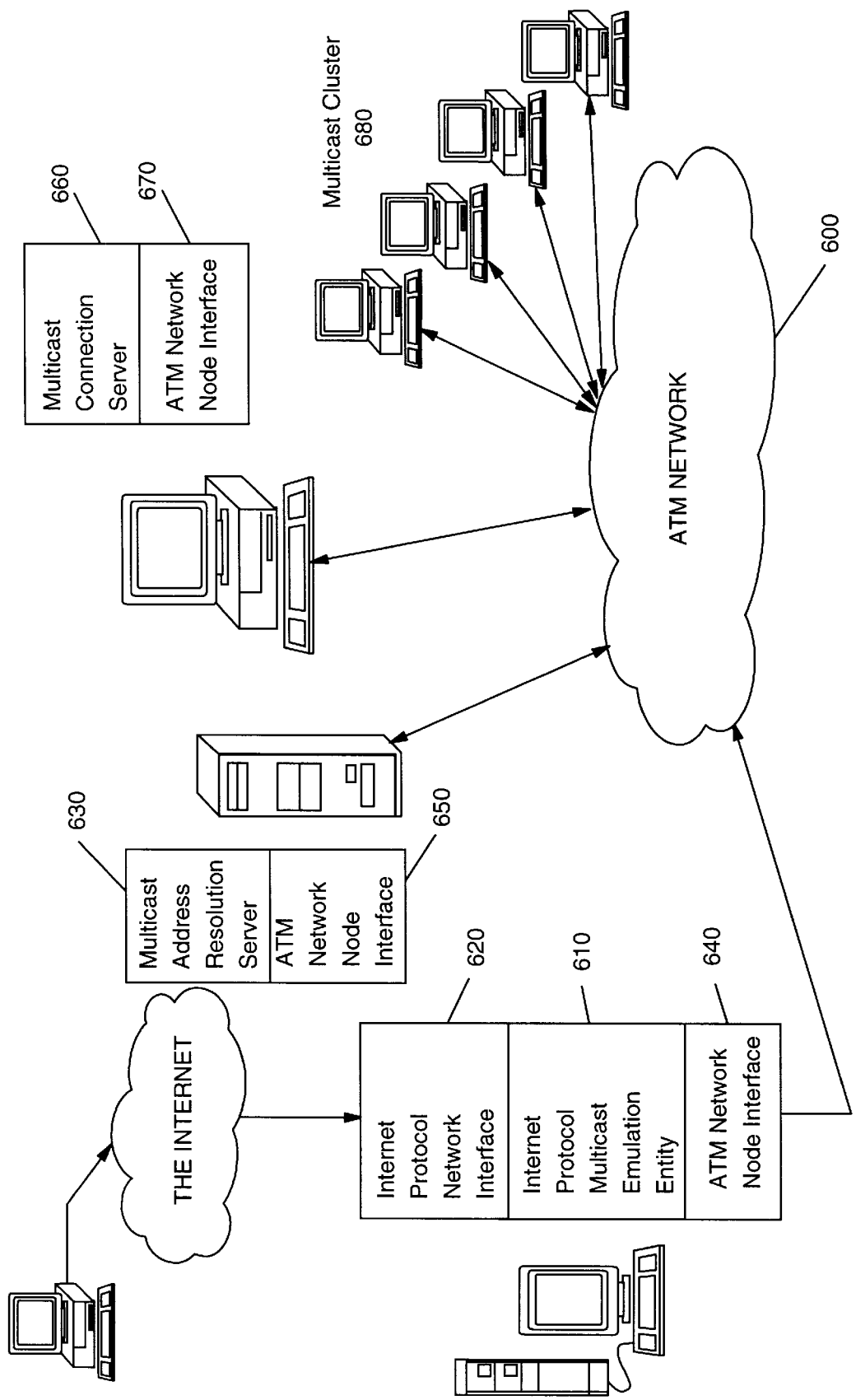
FIG. 6B is a partially schematic diagram which demonstrates the functioning of a MARS system wherein an MCS is utilized.

In some instances a "multicast cluster" may prove to be unwieldy. The solution to this has been to define what is known as a Multicast Connection Server (MCS). FIG. 6B is a partially schematic diagram which demonstrates the functioning of a MARS system wherein an MCS is utilized. As is shown in FIG. 6B, MCS 660 has been used to reduce the number of point-to-multipoint connections shown in FIG. 6A, by having MARS 630 Clients (e.g., Internet Protocol Emulation Entity 610 in FIG. 6A) forward their data to MCS 660, which MCS 660 subsequently forwards to multicast cluster 680.

In the foregoing described environment of FIG. 6B, QoS can be enabled efficiently using QoS registration as follows. Refer now to FIG. 7, which is a high level logic flowchart of the method and process whereby the present invention can be implemented in a MARS environment.

Method step 700 shows the start of the process. Method step 702 shows the definition of which specific multicast clusters will participate in the Quality of Service Registration scheme. Method step 704 shows informing the MARS as to which multicast connection servers will be participating in Quality of Service Registration. Method step 706 shows that the MARS then directs that each node in a defined multicast cluster register their desired QoS parameters with the MARS Server.

Method step 708 depicts that the MARS then computes the optimal QoS parameters for the point-to-multipoint connection established between the MCS and the nodes in the multicast cluster. Since this connection may be shared by all nodes, the computed QoS should also accommodate (i.e., must take into effect the likelihood of) simultaneous transmission by multiple nodes to the cluster through the MCS.

Method step 710 depicts that these parameters computed by the MARS are then relayed to the MCS during initialization (or whenever the parameters change). Method step 712 shows that the MCS then sets up communication with the cluster using this calculated QoS parameter. Method step 714 shows that the MARS computes the QoS parameters to be used by each Internet Protocol Multicast Emulation Entity for forwarding data to the MCS for multicast to the nodes in the multicast cluster, such QoS parameters are then used to establish the data communications with the MCS. Method step 716 depicts that this computed QoS information is then sent to the Internet Multicast Emulation Entity in the MARS reply messages. Method step 718 depicts that each MARS Internet Protocol Multicast Emulation Entity then uses the calculated QoS parameters sent to it by the MARS server in order to determine what QoS to request and use for communication with MCS 660.

The MCS uses the QoS parameters obtained from the MARS Server for the point-to-multipoint connection established to the "multicast cluster" (i.e., multicast group). Additionally, the MCS may keep track of the aggregate QoS of all the incoming calls from the Internet Multicast Emulation Entities. It rejects a QoS connection request if the resulting QoS would exceed that of the point-to-multipoint connection.

Those skilled in art will understand that many variations of the foregoing described scheme can be used. For example, each MARS Client (i.e., Internet Multicast Emulation Entity) can be provided with two sets of parameters: (a) guaranteed QoS, and (b) shared QoS. An MCS always accepts a connection request by a Client if the guaranteed QoS is requested. A Client may request an additional QoS (limited by shared QoS) if it desires. This connection request is honored by the MCS based on availability.

It is also envisioned that the present invention utilizing the QoS registration mechanism will benefit the next generation of multicast routing protocols, as is demonstrated by the following hypothetical situation.

Consider a MARS environment where all the MARS Clients in the multicast group register their desired QoS parameters with the MARS Server. Envision that some MARS Clients which support routing interfaces would periodically require to know the QoS it can support. Assume that a MARS Server computes this information and provides to the MARS Clients upon request.

Realize that, using a scheme similar to the one described previously, QoS routing decisions could be made more accurately since the computed QoS based on QoS registration gives the correct estimate, while the simple alternative of using the link capacity does not account for any QoS supported by the multicast group. Thus, the present invention could prove useful to the next generation of multicast protocol as well as to the present.

Illustrative Embodiment Directed Toward Resource Reservation Protocol

Resource Reservation Protocol (RSVP), is a signaling protocol which is used in Internet to set-up end-to-end QoS connections. Again, in a manner analogous to the overlay schemes discussed above, ATM networks are given this capability via an overlay system. The RSVP entities reside at RSVP capable routers and at the end-stations. On receiving an RSVP reservation request, the traffic control component of an RSVP entity makes an admission control decision and forwards the reservation requests if the reservation is acceptable. The admission control decision is based on the capacity of the interface and the current QoS utilization of the interface. If the interface (overlay system) is enabled using CIP, LANE or MARS then the QoS Registration mechanism can be used for efficient provisioning of QoS as follows.

(1) As described in reference to the above illustrative embodiments for ELAN and Multicast, a Client can be made aware of the QoS it can support to communicate with another Client, a cluster, or with an MCS (in case of MARS). This QoS information is made available to the RSVP entity at the router.

(2) The RSVP entity uses the QoS information (of step 1) as the total QoS supported by that interface. It uses this information in admission control decision.

Figure 8:
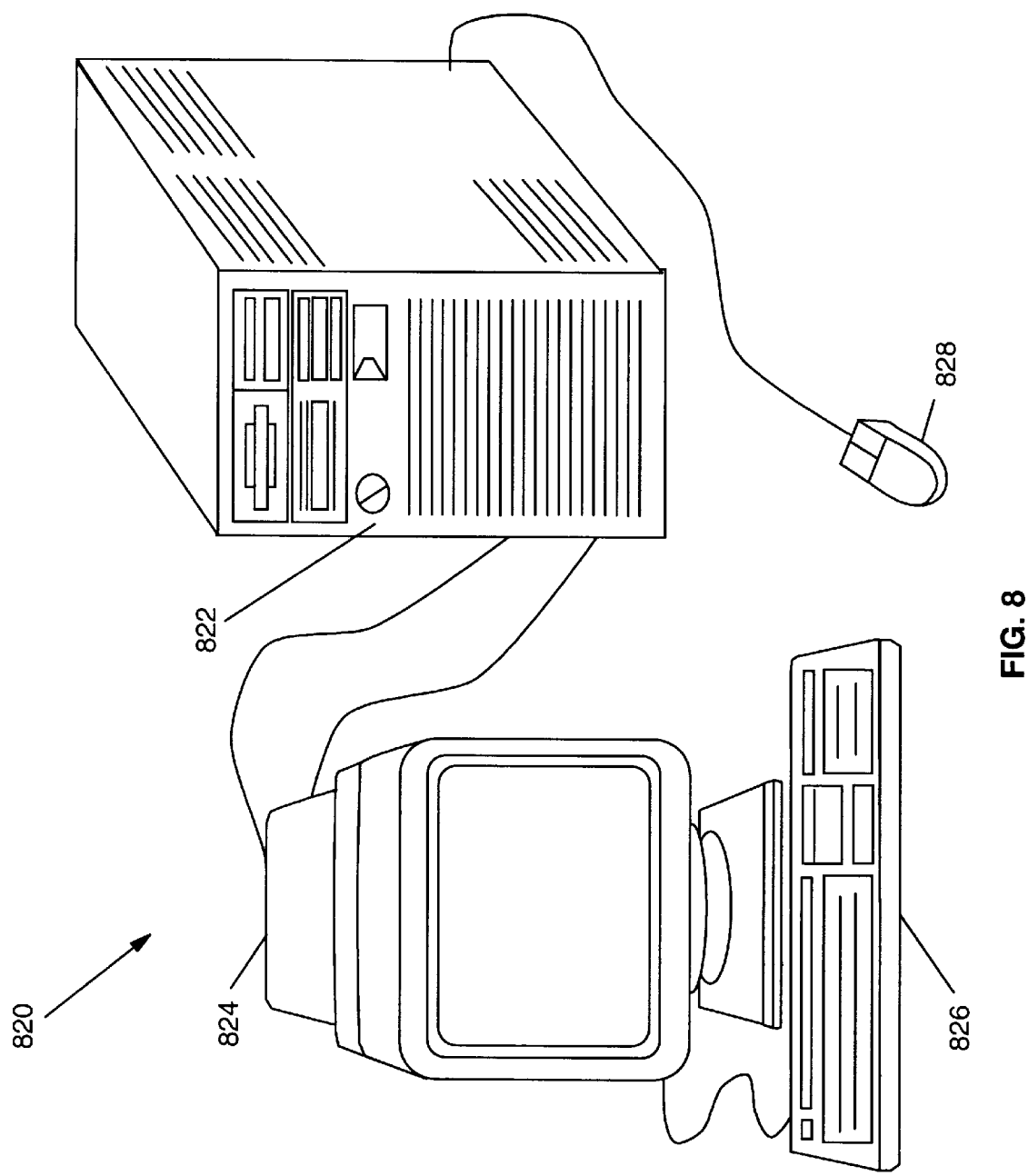
FIG. 8 depicts a pictorial representation of a data processing system which can be utilized in accordance with the method and system of an illustrative embodiment of the present invention.

With reference now to the figures and in particular with reference now to FIG. 8, there is depicted a pictorial representation of a data-processing system which can be utilized in accordance with the method and system of an illustrative embodiment of the present invention. Those skilled in the art will recognize that while the foregoing figures have illustrated the method and systems of illustrative embodiments of the present invention as modules running on computers, or data processing systems, such methods and systems could just as easily be implemented in hardware, software, firmware or a combination of such. Also, as will be recognized by those skilled within the art, such data processing systems can be referred to alternatively by the following (non-exclusive) terms: computers, computing systems, routers or switches. The method and system provided by an illustrative embodiment of the present invention can be implemented with the data-processing system depicted in FIG. 8. A computer 820 is depicted which includes a system unit 822, a video display terminal 824, a keyboard 826, and a mouse 828. Computer 820 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 9:
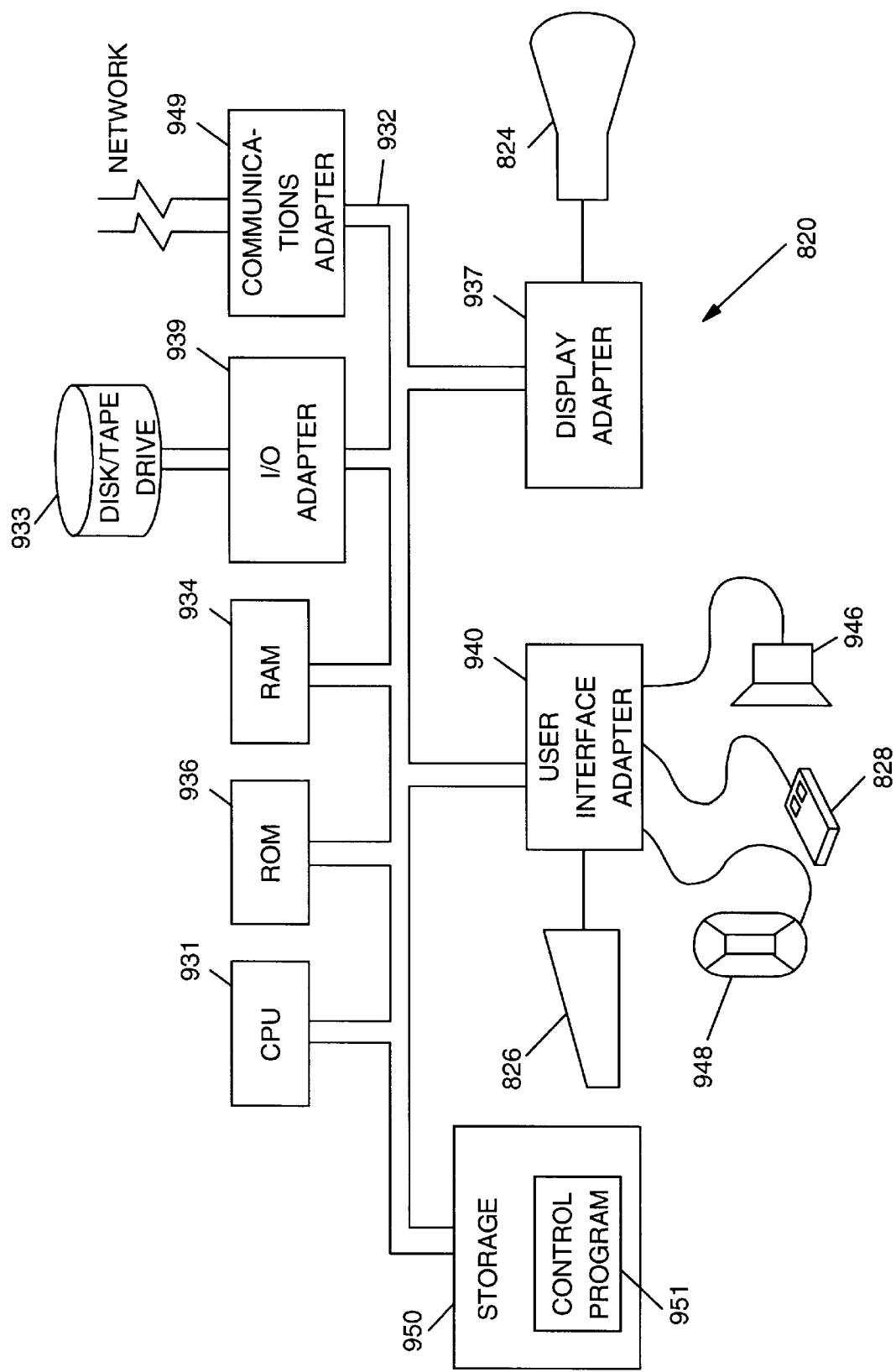
FIG. 9 is an illustration of a representative hardware environment which can be utilized in accordance with the method and system of an illustrative embodiment of the present invention.

FIG. 9 is an illustration of a representative hardware environment which can be utilized in accordance with the method and system of an illustrative embodiment of the present invention. FIG. 9 depicts selected components in computer 820 in which an illustrative embodiment of the present invention may be implemented. System unit 822 includes a Central Processing Unit ("CPU") 931, such as a conventional microprocessor, and a number of other units interconnected via system bus 932. Computer 820 includes random-access memory ("RAM") 934, read-only memory ("ROM") 936, display adapter 937 for connecting system bus 932 to video display terminal 824, and I/O adapter 939 for connecting peripheral devices (e.g., disk and tape drives 933) to system bus 932. Video display terminal 824 is the visual output of computer 820, which can be a CRT-based video display well-known in the art of computer hardware. However, with a portable or notebook-based computer, video display terminal 824 can be replaced with an LCD-based or a gas plasma-based flat-panel display. Computer 820 further includes user interface adapter 940 for connecting keyboard 826, mouse 828, speaker 946, microphone 948, and/or other user interface devices, such as a touch screen device (not shown), to system bus 932. Communications adapter 949 connects computer 820 to a data-processing network.

Any suitable machine-readable media may retain the method and system of an illustrative embodiment of the present invention, such as RAM 934, ROM 936, a magnetic diskette, magnetic tape, or optical disk (the last three being located in disk and tape drives 933). Any suitable operating system and associated graphical user interface (e.g., Microsoft Windows) may direct CPU 931. For example, the AIX operating system and AIXwindows windowing system (i.e., graphical user interface) can direct CPU 931. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 931, such as touch-screen technology or human voice control. In addition, computer 820 includes a control program 951 which resides within computer storage 950. Control program 951 contains instructions that when executed on CPU 931 carries out the operations depicted in any of all of the logic flowcharts of FIGS. 5A, 5B and 7 and perform the operations indicated by the partially schematic diagrams of FIGS. 4 and 6B as described herein.

Those skilled in the art will appreciate that the hardware depicted in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for more efficient network communications, to be utilized within a multiple protocol environment wherein one or more networks are utilizing different communications protocols, said method allowing one or more network protocol emulators, comprised of one or more network protocol emulation controllers and one or more network protocol emulation entities, which are overlaid onto said one or more networks utilizing different communication protocols for the purpose of allowing said one or more networks to be accessed and utilized as if said one or more networks were utilizing protocols emulated by said one or more network protocol emulators, said method comprising the steps of:

apprising said one or more network protocol emulation controllers of network capability information inherent within protocols utilized by said one or more networks;

utilizing said network capability information inherent within protocols utilized by said one or more networks to define communication capabilities for said one or more network protocol emulation entities within the control of said network emulation controllers; and utilizing said defined communications capabilities to ensure that said one or more network protocol emulation entities do not request communications links to one or more other network protocol emulation entities that substantially exceeds said defined communication capabilities of said one or more other network protocol emulation entities so that more efficient network communications are achieved.

2. The method of claim 1, wherein said step of apprising said one or more network protocol emulation controllers of network capability information inherent within protocols utilized by said one or more networks further comprises the step of directing said one or more network protocol emulation entities to register their communications capabilities with the appropriate one or more network information controllers.

3. The method of claim 1, wherein said step of utilizing said network capability information inherent within protocols utilized by said one or more networks to define communication capabilities further comprises the step of informing a network protocol emulation entity requesting communications with one or more other network protocol emulation entities of optimum communications parameters to be utilized when communicating with said one or more other network protocol emulation entities.

4. The method of claim 3, wherein said step of informing a network protocol emulation entity requesting communications with one or more other network protocol emulation entities of optimum communications parameters further comprises the step of:

informing said network protocol emulation entity requesting communications with said one or more other network protocol emulation entities of the last reported communications capabilities of said one or more other network protocol emulation entities with which communication is requested.

5. The method of claim 3, wherein said step of informing a network protocol emulation entity requesting communications with one or more other network protocol emulation entities of optimum communications parameters further comprises the step of:

calculating optimum communications parameters based upon the last reported communications capabilities of said one or more other network protocol emulation entities with which communication is requested; and informing said network protocol emulation entity requesting communications with said one or more other network protocol emulation entities of said calculated optimum communications parameters.

6. The method of claim 1, wherein said step of utilizing said defined communications capabilities to ensure that said one or more network protocol emulation entities do not request communications links to one or more other network protocol emulation entities that substantially exceeds said defined communication capabilities of said one or more other network protocol emulation entities further comprises the step of requesting communications links with said one or more network protocol emulation entities of a quality at or below said defined communications capabilities of said one or more other network emulations entities.

7. An apparatus for more efficient network communications, to be utilized within a multiple protocol environment wherein one or more networks are utilizing different communications protocols, said apparatus allowing one or more network protocol emulators, comprised of one or more network protocol emulation controllers and one or more network protocol emulation entities, which are overlaid onto said one or more networks utilizing different communication protocols for the purpose of allowing said one or more networks to be accessed and utilized as if said one or more networks were utilizing protocols emulated by said one or more network protocol emulators, said apparatus comprising:

means for apprising said one or more network protocol emulation controllers of network capability information inherent within protocols utilized by said one or more networks;

means for utilizing said network capability information inherent within protocols utilized by said one or more networks to define communication capabilities for said one or more network protocol emulation entities within the control of said network emulation controllers; and means for utilizing said defined communications capabilities to ensure that said one or more network protocol emulation entities do not request communications links to one or more other network protocol emulation entities that substantially exceeds said defined communication capabilities of said one or more other network protocol emulation entities so that more efficient network communications are achieved.

8. The apparatus of claim 7, wherein said means for apprising said one or more network protocol emulation controllers of network capability information inherent within protocols utilized by said one or more networks further comprises means for directing said one or more network protocol emulation entities to register their communications capabilities with the appropriate one or more network information controllers.

9. The apparatus of claim 7, wherein said means for utilizing said network capability information inherent within protocols utilized by said one or more networks to define communication capabilities further comprises means for informing a network protocol emulation entity requesting communications with one or more other network protocol emulation entities of optimum communications parameters to be utilized when communicating with said one or more other network protocol emulation entities.

10. The apparatus of claim 9, wherein said means for informing a network protocol emulation entity requesting communications with one or more other network protocol emulation entities of optimum communications parameters further comprises:

means for informing said network protocol emulation entity requesting communications with said one or more other network protocol emulation entities of the last reported communications capabilities of said one or more other network protocol emulation entities with which communication is requested.

11. The apparatus of claim 9, wherein said means for informing a network protocol emulation entity requesting communications with one or more other network protocol emulation entities of optimum communications parameters further comprises:

means for calculating optimum communications parameters based upon the last reported communications capabilities of said one or more other network protocol emulation entities with which communication is requested; and means for informing said network protocol emulation entity requesting communications with said one or more other network protocol emulation entities of said calculated optimum communications parameters.

12. The apparatus of claim 7, wherein said means for utilizing said defined communications capabilities to ensure that said one or more network protocol emulation entities do not request communications links to one or more other network protocol emulation entities that substantially exceeds said defined communication capabilities of said one or more other network protocol emulation entities further comprises means for requesting communications links with said one or more network protocol emulation entities of a quality at or below said defined communications capabilities of said one or more other network emulations entities.

13. A program product for more efficient network communications, to be utilized within a multiple protocol environment wherein one or more networks are utilizing different communications protocols, said program product allowing one or more network protocol emulators, comprised of one or more network protocol emulation controllers and one or more network protocol emulation entities, which are overlaid onto said one or more networks utilizing different communication protocols for the purpose of allowing said one or more networks to be accessed and utilized as if said one or more networks were utilizing protocols emulated by said one or more network protocol emulators, said program product comprising:

means for apprising said one or more network protocol emulation controllers of network capability information inherent within protocols utilized by said one or more networks;

means for utilizing said network capability information inherent within protocols utilized by said one or more networks to define communication capabilities for said one or more network protocol emulation entities within the control of said network emulation controllers;

means for utilizing said defined communications capabilities to ensure that said one or more network protocol emulation entities do not request communications links to one or more other network protocol emulation entities that substantially exceeds said defined communication capabilities of said one or more other network protocol emulation entities so that more efficient network communications are achieved; and signal bearing media bearing said means for apprising, means for utilizing said network capability information, and means for utilizing said defined communications capabilities.

14. The program product of claim 13, wherein said signal bearing media further comprises recordable media.

15. The program product of claim 13, wherein said signal bearing media further comprises transmission media.

16. The program product of claim 13, wherein said means for apprising said one or more network protocol emulation controllers of network capability information inherent within protocols utilized by said one or more networks further comprises means for directing said one or more network protocol emulation entities to register their communications capabilities with the appropriate one or more network information controllers.

17. The program product of claim 13, wherein said means for utilizing said network capability information inherent within protocols utilized by said one or more networks to define communication capabilities further comprises means for informing a network protocol emulation entity requesting communications with one or more other network protocol emulation entities of optimum communications parameters to be utilized when communicating with said one or more other network protocol emulation entities.

18. The program product of claim 17, wherein said means for informing a network protocol emulation entity requesting communications with one or more other network protocol emulation entities of optimum communications parameters further comprises:

means for informing said network protocol emulation entity requesting communications with said one or more other network protocol emulation entities of the last reported communications capabilities of said one or more other network protocol emulation entities with which communication is requested.

19. The program product of claim 17, wherein said means for informing a network protocol emulation entity requesting communications with one or more other network protocol emulation entities of optimum communications parameters further comprises:

means for calculating optimum communications parameters based upon the last reported communications capabilities of said one or more other network protocol emulation entities with which communication is requested; and means for informing said network protocol emulation entity requesting communications with said one or more other network protocol emulation entities of said calculated optimum communications parameters.

20. The program product of claim 13, wherein said means for utilizing said defined communications capabilities to ensure that said one or more network protocol emulation entities do not request communications links to one or more other network protocol emulation entities that substantially exceeds said defined communication capabilities of said one or more other network protocol emulation entities further comprises means for requesting communications links with said one or more network protocol emulation entities of a quality at or below said defined communications capabilities of said one or more other network emulations entities.

* * * * *